United States Patent [19]

Marsocci et al.

[11] 4,424,553
[45] Jan. 3, 1984

[54] MULTIDIRECTIONAL MOUNT FOR ELECTRICAL INSTRUMENTS

[75] Inventors: Angelo A. Marsocci, Duxbury; Robert B. Powers, Norwell; Bruce E. Chapman, Hanover, all of Mass.

[73] Assignee: American District Telegraph Company, Jersey City, N.J.

[21] Appl. No.: 319,430

[22] Filed: Nov. 9, 1981

[51] Int. Cl.³ .......................... H02B 1/04; H05K 7/12
[52] U.S. Cl. ..................... 361/427; 340/629; 339/122 F; 361/331; 361/419; 174/52 R; 174/54
[58] Field of Search ........ 361/331, 356, 364, 369–371, 361/380, 392, 395, 399, 417, 419, 427; 248/342–345, 222.3, DIG. 6, 27.1; 339/122 F; 220/3.7, 293; 174/52 R, 54, 56, 61; 73/431; 116/312, 315; 340/628–630

[56] References Cited

U.S. PATENT DOCUMENTS

| | | | |
|---|---|---|---|
| 2,494,428 | 1/1950 | Buck | 339/122 F |
| 3,459,262 | 8/1969 | Powell | 116/312 |
| 3,767,917 | 10/1973 | Lampart | 340/629 |
| 4,023,697 | 5/1977 | Marrero | 220/3.7 |
| 4,092,641 | 5/1978 | Bellinghausen | 340/629 |
| 4,243,981 | 1/1981 | Beyersdorf | 340/629 |

Primary Examiner—G. P. Tolin
Attorney, Agent, or Firm—James H. Grover

[57] ABSTRACT

A mounting bracket having multiple bayonet coupling elements which interengage with the bayonet coupling elements located on the body of an electrical instrument to be attached to a junction box. Additionally and in combination with the bayonet coupling elements, on the bracket and instrument body respectively, are included a pawl and ratchet arrangement for providing fine rotational adjustment while a toothed spring finger attached to the bracket engages a notched annular wall on the instrument body so as to latch and further secure the bracket to the body. It is anticipated that the mounting bracket will have to be attached to any one of several types of junction box thereby necessitating a multidirectional coupling arrangement for properly attaching the subject instrument to the particular junction box encountered.

11 Claims, 7 Drawing Figures

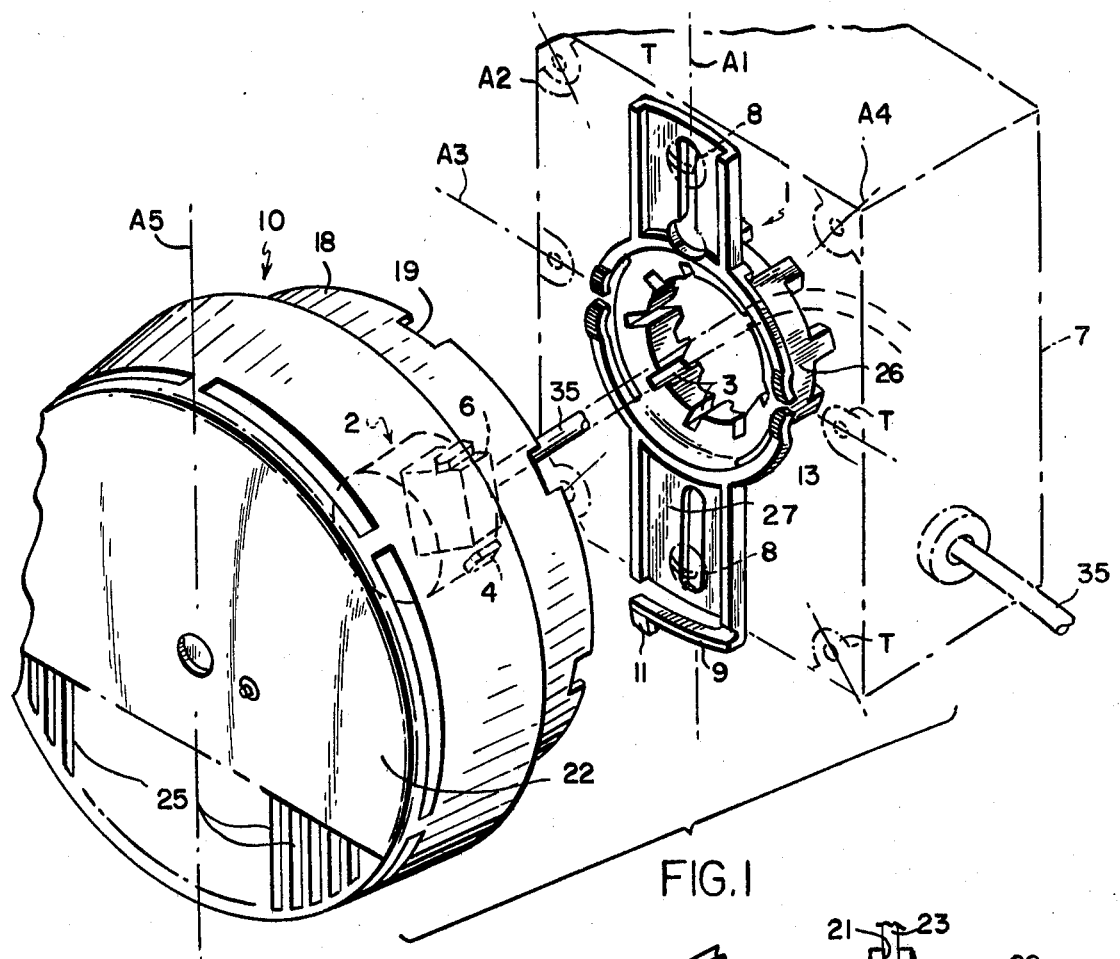
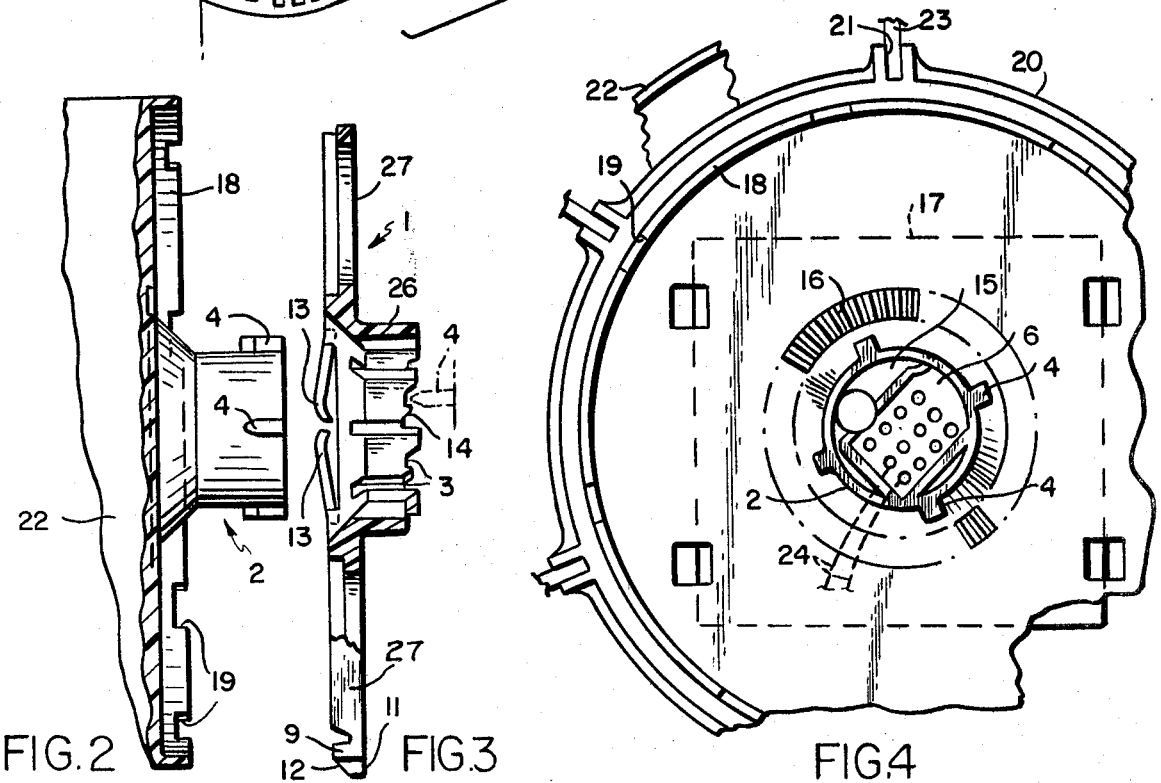

MULTIDIRECTIONAL MOUNT FOR ELECTRICAL INSTRUMENTS

BACKGROUND OF THE INVENTION

This invention relates to mounting electrical instruments, particularly smoke detectors, to unknown junction boxes that could vary from one to the next in both type and installation position.

In many instances where one desires to attach an electrical instrument, such as a smoke detector, to a junction box, it is not known beforehand whether the electrician who installed the junction box was precisely accurate in anticipating the requirements for accommodating the particular subsequent instrument to be mounted. The prior art addresses this tolerance variable generally with instrument base plate members that are radially slotted but in a fixed position. The fact that an otherwise slotted instrument base plate member is essentially fixed in a particular position is a substantial limiting factor when endeavoring to precisely and accurately accommodate the installation requirements of a specific electrical instrument.

It is therefore the object of the present invention to provide a means for mounting various smoke detectors and other electrical instruments wherein the mounting means combine structural elements that allow a choice of up to eight possible mounting positions with structural means for fine rotational adjustment within any one of the eight mounting positions chosen.

SUMMARY OF THE INVENTION

According to the invention a mount for an electrical instrument having a predetermined vertical orientation comprises a bracket member with means for attachment to any one of several types of junction box at any of several possible angles determined by the type and installation of the box selected, a base member holding the electrical instrument in mechanical connection to the box, the base and bracket having a bayonet coupling including at least one knob element interengaging with a groove element on the respective members, an even number of one element being equiangularly spaced around the coupling axis at angles including the possible box angles, the knob and groove element dimensions allowing play for fine angular adjustment of the interengaged base and bracket members and interengaging means on the bracket and base members for holding the base in fine adjusted position.

Also according to the invention, the interengaging means include a pawl on one member engaging an annular ratchet on the other member.

And further according to the invention the base includes an annular wall with notches having the same angular spacing as the bayonet element spacing, and the bracket includes a spring finger engaging in a notch to latch the base on the bracket.

BRIEF DESCRIPTION OF THE DRAWINGS

FIG. 1 is an exploded isometric view of a smoke detector and a mounting bracket according to the invention;

FIG. 2 is a side view partly broken away and in section of the smoke detector;

FIG. 3 is a cross-sectional side view of the mounting bracket;

FIG. 4 is an underside view of the smoke detector;

DESCRIPTION OF THE PREFERRED EMBODIMENT

Figure 5:
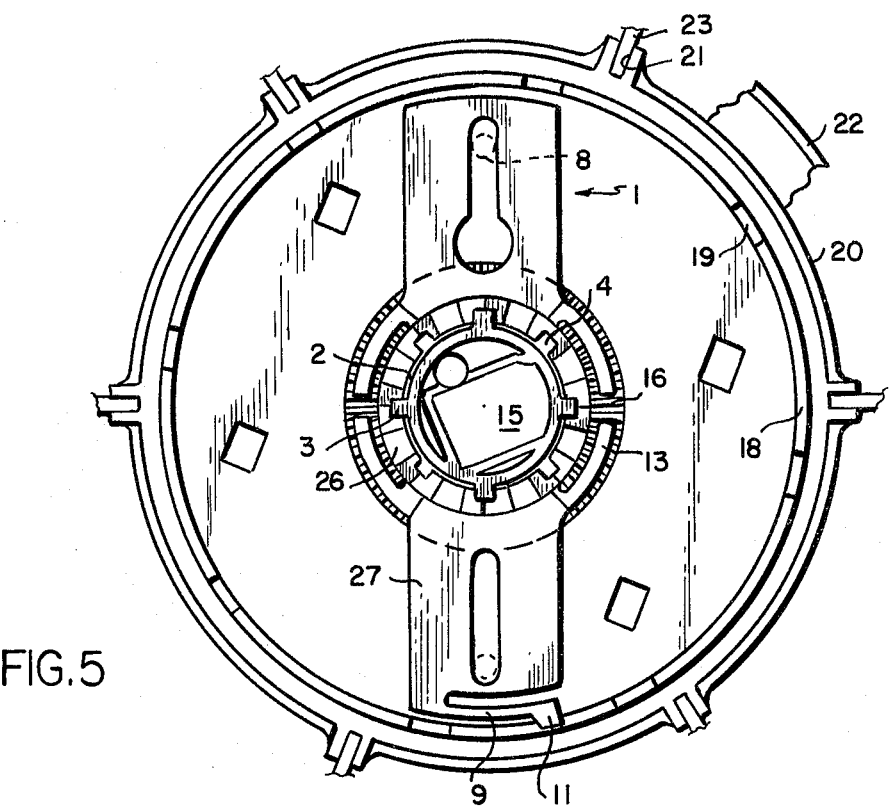
FIG. 5 is an underside view of the bracket with the smoke detector partially inserted therein.

Shown in FIG. 1 is a smoke detector housing 22 having louvres 25 which are designed to run vertically if the detector is correctly and precisely oriented when mounted on a wall. The detector has in the center of its base an annular neck 2 adapted to engage in a mating annular bayonet coupling collar 26 on a mounting bracket 1. The mounting bracket 1 is designed to be attached by screws 8 inserted through mounting collar straps 27 to one pair of tabs T on a conventional junction box 7 shown in phantom. The box may have as many as four pairs of tabs T on the axes—A1, A2, A3 and A4. Despite the desirability of having the smoke detector precisely oriented with vertical lourvres, the junction box 7 may be installed by one workman until approximately vertically oriented. The mounting bracket 1 may then be installed by another workman on any one of the four tab axes. Thus the mounting bracket may deviate from vertical orientation by the error in mounting of the junction box and by the selection of mounting tabs axis as well as minor deviations due to variations in the manufacture of the tabs and in the fit of the mounting screws in the mounting bracket.

The smoke detector housing 22 has inner radial webs 23 engaging register slots 21 that are correspondingly but asymmetrically disposed on the circumference of an insulative plastic base 20. The base 20, in turn, comprises an exterior annular wall 18 having eight intermittent notches 19 that are correspondingly and equiangularly spaced with eight L-shaped grooves 3 on the inner circumference of the coupling collar 26. Radially inwardly of the annular wall 18 and integrally formed with or attached to the outer surface of the base 20 is the bayonet coupling neck 2 shown in broken line in FIG. 1 and in full line in FIG. 2.

As shown in FIG. 4 within the detector neck 2 is a multiple socket connector 6 with holes for holding either male or female electrical connectors (not shown) disposed radially inwardly of and parallel to the axis of the bayonet coupling neck 2, the connector 6 having wires 24 attached thereto and extending radially outwardly therefrom through a passage 15 to form an electrical connection with a power and signal cable 35 shown in FIG. 1. Also shown in broken lines is a printed circuit board 17 that is mechanically attached to the inner surface of the base 20 and electrically connected to the socket connector 6. A ratchet ring 16 is embossed on the outer surface of the base 20, the ratchet ring 16 circumscribing the coupling neck 2.

When manually mounting the smoke detector 10 to the bracketed junction box 7 as shown in FIG. 1. four knobs 4 on the coupling neck 2 and base 20 are aligned with four of the eight L-shaped grooves 3 on the coupling collar 26 of the bracket 1 in such a way that the requisite axis A5 for the mounted detector 10 will be achieved upon insertional register and rotational interengagement between the knobs 4 and the grooves 3.

Figure 6:
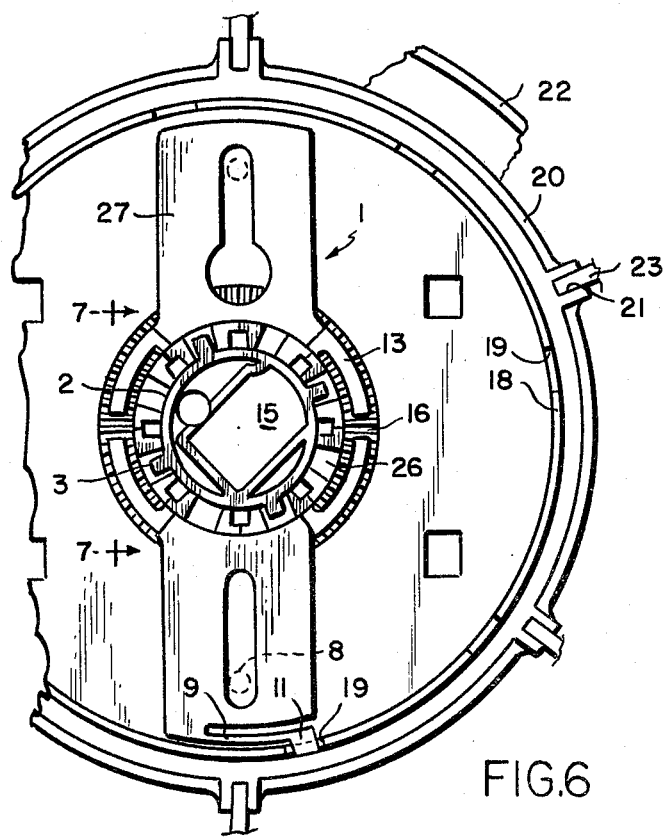
FIG. 6 is the same view as FIG. 5 but showing the detector in locked engagement in the bracket and with pawls engaged in an annular ratchet.
Figure 7:
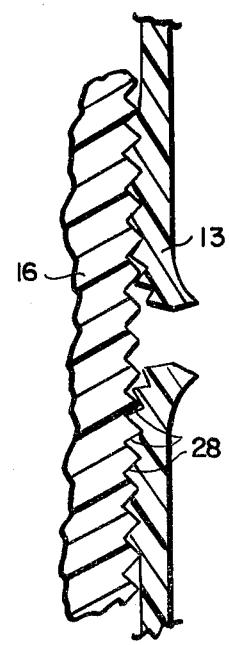
FIG. 7 is an enlarged section on line 7—7 of FIG. 6 showing the pawls interengaging ratchet.

FIG. 5 illustrates the alignment of the mounting bracket 1, its coupling collar 26 and the L-shaped grooves 3, at the point of insertional register with the knobs 4 on the coupling neck 2 of the base 20. It should also be noted that a spring finger 9 is attached to an end on the bracket strap 27 of the bracket 1, the finger 9 having a tooth 11. As the smoke detector 10 is brought to insertional register with the mounting bracket 1 on the junction box 7, the spring finger 9 is deflected radially inwardly of the annular wall 18 as axial movement of the detector neck 2 moves the detector wall 18 past the tooth 11. Then, when the detector is rotated, interengagement between the knobs 4 and the grooves 3 is effected to form a bayonet coupling as shown in FIG. 6. According to the invention the knobs 4 and grooves 3 are dimensioned to allow play for fine angular adjustment of the interengaging coupling neck 2 and coupling collar 26. Furthermore, the tooth 11 on the spring finger 9 engages in the notch 19 on the annular wall 18 as the knobs 4 interengage with the grooves, the tooth 11 to thereby further latch the base 20 on the bracket 1. The notch 19 is wider than the tooth 11 to allow a small play for fine angular orientation of the detector. In addition, at least two oppositely directed arcuate and resilient two-way pawls 13 are integrally attached to the outer circumference of the coupling collar 26 for engaging the ratchet ring 16. The pawls 13 have teeth 28 to provide fine adjustment as shown in FIG. 7. Complimentarily, the notches 19 are dimensioned to allow movement of the tooth 11 on the spring finger 9 when the tooth 11 is in the notch 19, thereby to provide and also permit the fine adjustment rendered by the pawls 13 and ratchet ring 16.

When the smoke detector 10 is finally mounted and adjusted on the bracket 1 and junction box 7, a shoulder 14 (shown in FIG. 3) that is integrally formed with the coupling collar 26 and is intermediately disposed of the L-shaped groove 3 provides a stop means against counter rotation of the smoke detector 10 once it is fully mounted.

Thus the gross mounting errors of the bracket 1 on the junction box 7 are compensated by the selection of one of the eight choices of inserting the detector in the bracket, while small errors in the junction box 7 and bracket 1 orientation are compensated by the fine ratchet adjustment.

Both the smoke detector housing and mounting bracket may be molded of a suitable insulative thermoplastic such as is sold by General Electric Company under the trademark NORYL.

It should be understood that the present disclosure is for the purpose of illustration only and that this invention includes all modifications and equivalents which fall within the scope of the appended claims.

I claim:

1. A mount for an electrical instrument having a predetermined vertical orientation comprising:
   a bracket member with means for attachment to any one of several types of junction box at any of several possible angles determined by the type and installation of the box selected;
   a base member holding the electrical instrument in mechanical connection to a junction box, the base and bracket member having a bayonet coupling including at least one knob element interengaging with one or more groove elements on the respective members, an even number of one element being equiangularly spaced around the coupling axis at angles including the possible box angles, the knob and groove element dimensions allowing play for fine angular adjustment of the interengaged base and bracket members; and
   interengaging means on the bracket and base members including a pawl on one member adjustably engaging an annular ratchet on the other member for holding the base in fine adjusted position.

2. A mount according to claim 1 wherein the ratchet is a serrated ring embossed on the base.

3. A mount according to claim 1 wherein the pawl is a two-way pawl.

4. A mount according to claim 3 wherein the pawl is an arcuate resilient pawl extending from one member along the annular ratchet.

5. A mount according to claim 4 including at least two oppositely directed pawls.

6. A mount according to claim 1 wherein the base includes an annular wall with a notch and the bracket includes a spring finger engaging the notch to latch the base angularly on the bracket.

7. A mount according to claim 6 wherein the notch is dimensioned to allow movement of the finger in the notch for the fine adjustment of the base.

8. A mount according to claim 7 wherein the finger has an outer cam surface engaged by the wall to deflect the finger radially inwardly of the wall to a sprung position as the bayonet coupling elements interengage, the finger snapping outwardly into the notch on completion of the bayonet rotary coupling interengagement, thereby to limit the fine adjustment within the range of play of the bayonet coupling.

9. A mount according to claim 8 wherein the limit of the fine adjustment is within the range of play of the bayonet coupling.

10. A mount according to claim 8 including a plurality of notches having the same angular spacing as the bayonet element spacing.

11. A mount according to claim 1 wherein the bayonet coupling on the base comprises a hollow neck the neck is approximately central of the base member.

* * * * *